(12) United States Patent
Dev (10) Patent No.: US 12,386,814 B2
(45) Date of Patent: Aug. 12, 2025

(54) DATA CONFLICT RESOLUTION IN PERIODICALLY OFFLINE SYSTEMS

(71) Applicant: SAP SE, Walldorf (DE)

(72) Inventor: Nipun Dev, Bangalore (IN)

(73) Assignee: SAP SE, Walldorf (DE)

( * ) Notice: Subject to any disclaimer, the term of this patent is extended or adjusted under 35 U.S.C. 154(b) by 456 days.

(21) Appl. No.: 17/682,332

(22) Filed: Feb. 28, 2022

(65) Prior Publication Data

US 2023/0273915 A1   Aug. 31, 2023

(51) Int. Cl.
*G06F 16/23* (2019.01)
*G06F 16/27* (2019.01)

(52) U.S. Cl.
CPC ...... *G06F 16/2365* (2019.01); *G06F 16/2372* (2019.01); *G06F 16/27* (2019.01)

(58) Field of Classification Search
CPC .. G06F 16/2365; G06F 16/2372; G06F 16/27; G06F 16/273; G06F 16/275; G06F 16/278; H04L 65/1083; H04L 65/1095; H04L 67/561
USPC ........................................................ 707/610
See application file for complete search history.

(56) References Cited

U.S. PATENT DOCUMENTS

| | | | | |
|---|---|---|---|---|
| 5,787,262 A | * | 7/1998 | Shakib | G06F 9/52 709/201 |
| 8,352,870 B2 | * | 1/2013 | Bailor | G06F 16/954 715/230 |
| 2011/0302479 A1 | * | 12/2011 | Movida | G06F 16/27 714/E11.067 |
| 2017/0161313 A1 | * | 6/2017 | Ritter | G06F 16/2365 |

* cited by examiner

*Primary Examiner* — Michael Pham
(74) *Attorney, Agent, or Firm* — SCHWEGMAN LUNDBERG & WOESSNER, P.A.

(57) ABSTRACT

Computer-readable media, methods, and systems are disclosed for electronic data conflict resolution in periodically offline systems. In response to detecting one or more conflicts on a particular electronic data entity, conflict metadata items associated with the one or more conflicts are inserted into a conflict staging data structure. For each of the conflict metadata items inserted into the conflict staging data structure, the conflict metadata items with their associated datasets are retrieved and evaluated. Based on the conflict evaluation, a valid data value is selected from among the associated datasets. Based on the valid data value, the particular electronic data entity is synchronized to one or more backend systems.

20 Claims, 6 Drawing Sheets

DATA CONFLICT RESOLUTION IN PERIODICALLY OFFLINE SYSTEMS

TECHNICAL FIELD

Embodiments generally relate to data conflict resolution, and more particularly to resolving data conflicts where changes have been made in remote systems that have, for a period of time, been disconnected from network access.

Remote networked systems may not be able to connect to particular backend systems at certain times. In such remote networked systems that become periodically disconnected, conflicts may arise in connection with data objects that are modified by different users or clients. Such conflicts may cause transactions to become temporarily locked and therefore the underlying data blocked from further processing and updating. Additionally in complex electronic data processing scenarios that are operated in offline mode, conflicts in connection with grouped or related electronic data objects may cascade through a data model, thereby resulting in data inconsistency and associated electronic data audit issues. Accordingly, what is needed is a mechanism for resolving data conflicts where changes have been made in remote systems that have, for a period of time, been disconnected from network access, thereby addressing the above-identified problems.

SUMMARY

Disclosed embodiments address the above-mentioned problems by providing one or more non-transitory computer-readable media storing computer-executable instructions that, when executed by a processor, perform a method for resolving data conflicts where changes have been made in remote systems that have, for a period of time, been disconnected from network access, the method comprising: in response to detecting one or more conflicts on a particular electronic data entity, inserting conflict metadata items associated with the one or more conflicts into a conflict staging data structure, for each of the conflict metadata items inserted into the conflict staging data structure, retrieving and evaluating the conflict metadata items with their associated datasets to generate a conflict evaluation, based on the conflict evaluation, selecting a valid data value from among the associated datasets, and based on the valid data value, synchronizing the particular electronic data entity at one or more backend systems.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 4 is a user interface in which exemplary methods are depicted for implementing methods for electronic data conflict resolution in periodically offline systems;

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

In some embodiments, periodically disconnected systems operate in remote environments under a paradigm referred to as disconnected light operations (DLO), a lightweight and readily deployable system that nevertheless has significant data processing capabilities. DLO addresses requirements of industry units under configurations in which systems continue to function with periodically little or no network communication with backend systems. Such periodically disconnected systems offer a subset of software application platforms providing functionality that covers operational requirements in remote places on earth, such as surface shipping channels, far from ground-based networking base stations.

DLO enabled systems provide data conflict resolution techniques needed to manage data conflict scenarios associated with periodically disconnected clients and/or servers. Such a model provides benefits for systems in remote locations for industries such mining, overseas shipping, and other activities that may be conducted in remote locations. Consistent with the present teachings, a data conflict is a condition under which a preexisting record may be modified at a disconnected lightweight client (DLC) and subsequently synchronized with a backend server. A data conflict arises, for example, where a particular operation is performed on a data item that has been modified since the last time a DLC has been updated. Such a disconnected data change means that a corresponding DLC data transaction may have been performed on stale, or otherwise not-yet-synchronized data, and the transaction should be replayed against the updated data in the backend system.

In some other embodiments, conflict scenarios involve situations in which preexisting records may be modified in a disconnected system where there is a subsequent attempt to synchronize the updated data with a backend system. In such a scenario, synchronization is attempted after a corresponding data item in the backend system has also been modified. This implies that the user transaction happened on a stale data item. Such a transaction enters a conflict state in which there is ambiguity with respect to which system has the valid value for a particular data item. Where such a transaction enters a state of ambiguity (conflict), unable to decide which data needs to be posted into which system (Client to Server or vice versa). Conflicts occur at the record level irrespective of the fields in the object. One or many conflicts can occur on a single record. In some embodiments, conflicts are resolved in the order of their occurrence in case of multiple conflicts on the same record.

In some embodiments, a user creates a data entry corresponding to a transaction for the movement of goods (i.e., a goods receipt, a goods issue, or a goods transfer posting) at a DLC for an arbitrary serialized material. A serialized material may be any discrete item or bulk material bearing an associated serial number. Meanwhile in a DLS, a similar transaction may have been created for a serialized material bearing the same serial number. In this state, a synchronization would result in a conflict scenario. In such a scenario, the described transaction would be in conflict because the same serial number was used in two separate transactions. Even if adequate inventory exists to fulfill both transactions, a single part bearing a single serial number cannot be delivered to two distinct and separate destinations.

In another scenario, a unique identification number may have been generated by a backend system for a DLO offline record, such as a work order. In this scenario, a user may be still working on the DLO temporary number-based record since the client was not synchronized. In this example, the user updates a release refused purchase requisition (PR) item detail (e.g., quantity) in a DLS. Meanwhile in a corresponding backend system, the PR is set to an approved state. In this state, a synchronization would result in a conflict scenario with a conflict error message stating that the object was changed by a user at a given date and time since the last synchronization.

In these embodiments, any further update in the disconnected system to the same object that is already in conflict and unresolved results in further conflicting transactions on the same object row. With an existing conflict, no updates can be processed until the conflicting transactions for that object are resolved in the order of their occurrence. In some such embodiments, conflict resolution is a methodical activity performed by an administrator with expert knowledge of the periodically disconnected systems and underlying electronic processes. Options available to resolve conflicts must be used with caution and systematically via established procedures to ensure transactional integrity and data consistency. It is beneficial to minimize or (if possible) avoid conflicts by means of application logic and change control processes. The longer a user runs in disconnected mode, the more challenging it may become to synchronize remote data to the backend, because of accumulation of changed and potentially conflicting records.

Multiple users working on the same objects also can result in data conflicts, especially if the users are working on stale data or data objects are updated in the background. It may be beneficial to train users for such cases and to develop application processes to facilitate avoidance or minimization of such situations. In some embodiments, an attempted synchronization will provide an indication to a periodically disconnected system that a conflict has arisen with respect to a particular data item. Further updates in the periodically disconnected system to the particular data item that is in a state of unresolved conflict may not be allowed. In these embodiments, an attempted update to such a data item in conflict may be interrupted at the DLC with a message indicating that the transaction was ignored due to a previous error for the same or related data item. In these embodiments, a periodically disconnected system will not be allowed to update the conflicted data item until the underlying conflicting transactions for that object are resolved in the order of their occurrence using, for example, overwrite, delete, or ignore options in a central administration console associated with the backend system as described below in connection with FIG. 4.

Various conflict scenarios may occur and be resolved as described in connection with the present teachings. One conflict scenario involves multiple conflicts arising in connection with a particular data row due to simultaneous or asynchronous updates at multiple offline remote clients.

Another conflict scenario relates to a situation in which one or more in a group of related transactions enter a data conflict thereby putting the whole group in conflict/pause state. A specific example would be a notification, such as a work order combination. Whenever a work order is updated, there could be a simultaneous update via its relation to a notification. So, if a work order is blocked due to a conflict it is imperative that a corresponding notification data item is blocked as well.

Various conflict resolution techniques are provided to resolve various types of conflicts. A first scenario involves multiple conflicts on the same transaction object. In this scenario, there are two design approaches developed to resolve conflicts. Each handler requires a different strategy for transaction management in a periodically disconnected system. In some embodiments, at the time a particular software product is deployed, a deploying user may choose one of a set of resolution strategy options using configuration options associated with the software being deployed.

In a first option, or a so-called "singleton" approach, each conflict is detected and stored with the conflict's corresponding data set in a staging table such that every conflict transaction may be sequentially accepted or rejected. In this option, each transaction is stored in a staging table and not moved to the main table until conflict check is performed and thereby resolved as needed. The singleton approach is beneficial in terms of transaction auditing because each object update is associated with a single, easily identified user. On the other hand, the singleton approach has several disadvantages. First, there is a need to maintain transaction history, data, and sequence associated with each conflicting record at a row level. Second, this requires substantial overhead (in terms of time and effort) for a conflict administrator to resolve each conflict without a bulk processing or merge option.

In a second option, or a so-called "merge" approach, each conflict is detected but only one/latest conflict data is maintained in the staging tables. At staging, every new conflict on the same object updates the existing row keeping the latest data from all transactions consolidated into one. This is the easiest and most common approach to resolve conflicts between data systems. The merge approach is beneficial in terms of being more straightforward to develop and troubleshoot. Under this approach, no data loss occurs, as the latest transaction record data set is a consolidation of all previous updates in an associated queue. Moreover, the merge approach involves less overhead (in terms of time and effort) for a conflict administrator. On the other hand, the merge approach has the disadvantage of interfering with transaction auditing, by rendering ambiguous object updates by different users.

In another scenario, a conflict may be detected in connection with a group of related transactions. In some embodiments, analogous techniques as explained above may be applied to a whole group of related transactions. Each transaction object in the relationship group will be handled based on the technique altogether. If a conflict is detected on a transaction object which is in a group and/or has references or child/parent objects in the same cycle, then all of them need to be put in a pause state until the leading transaction is cleared of conflicts and then its child/parent or related objects are processed. For example, when a work order conflict is resolved, automatically the blocker to related notification will be removed and both objects' data sets will be applied to their respective data models or DB tables.

By way of another example, an enterprise asset maintenance scenario involves a notification that has been created for asset maintenance, resulting in a work order being generated and a purchase requisition of parts raised for completing the work order. This scenario when managed in disconnected mode relies on the grouping of these 3 object types, namely maintenance notification, work order (WO) and purchase requisition (PR). Any interrupts or conflicts or errors to any of these objects in a group can result in inconsistent system behaviors and issues with functional correctness.

By way of another example, a redundancy situation may be encountered where two PRs are created for the same work order by different user actions when in disconnected mode. With the group conflict concept, some of these situations can be handled or avoided. In such a case, the conflict would be detected on the work order by providing a user interface to an administrator to facilitate discarding the second, redundant PR and thereby enabling the first PR to be accepted and passed on to backend systems for further processing. This approach has several benefits, including facilitating transaction auditing and ensuring functional correctness, thereby enabling management of potential data inconsistency and redundant purchase requisitions in the system. Disadvantages include a need to maintain transaction history, data, and sequencing for each conflicting group and its transactions, resulting in a complex development service, and overhead for administrators to resolve each scenario individually based on a set of predefined rules.

For example, if a PR is updated by a first user while a corresponding work order is updated by a second user, both transactions can enter a conflict as the first user's PR update in turn also updates the associate work order data item as well being in a group. So, there will be conflicting updates to the work order. If the second user's update is accepted then the first user's update to the work order due to creation of a conflicting PR, the PR update itself must be rolled back to maintain a consistent and correct data state. In some embodiments, a backend system would only discard the work order of the first user, taking no action with respect to the associated PR. This may remain stray with incorrect associations leading to further issues.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

Figure 1:
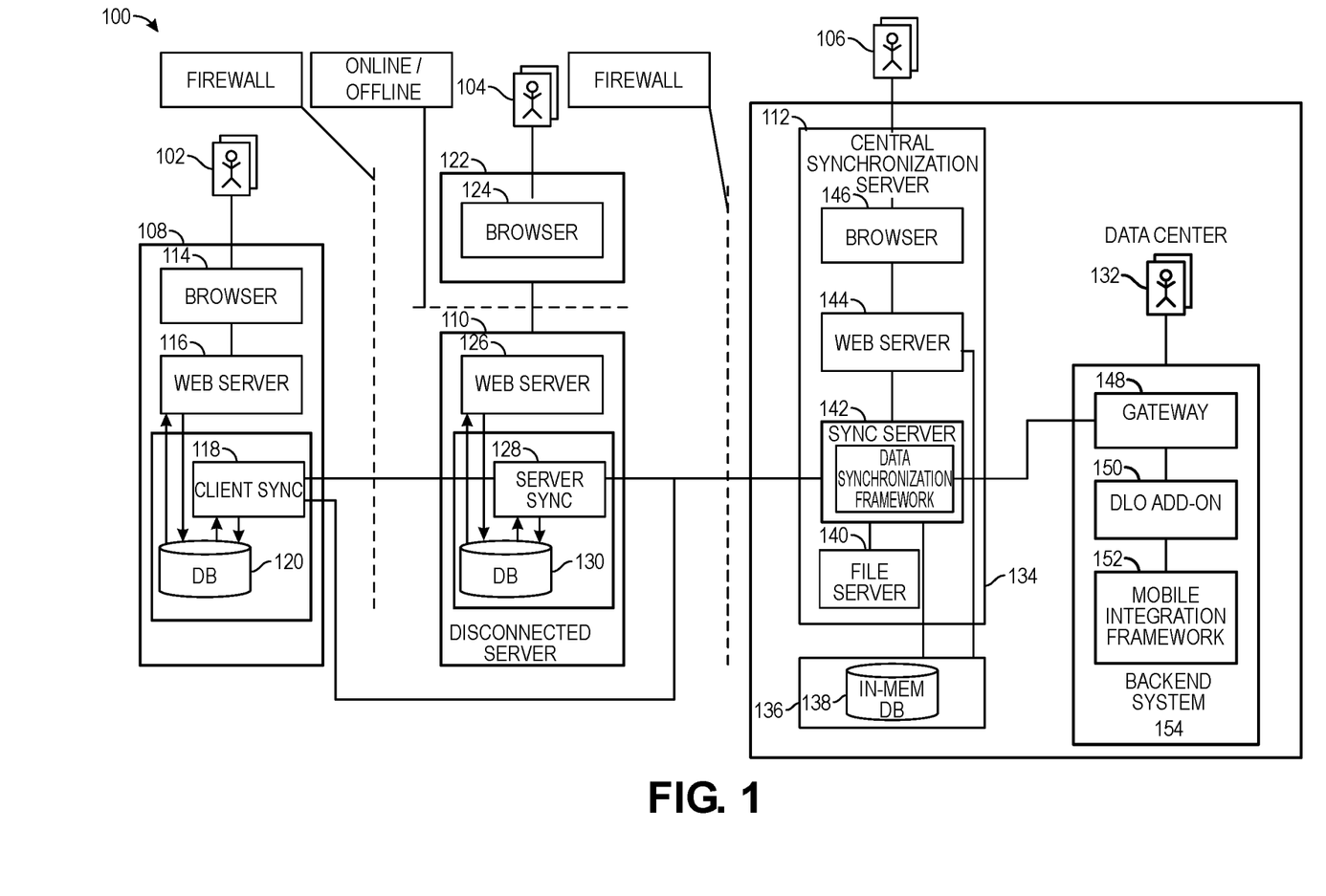
FIG. 1 is a system diagram illustrating networked systems that can be used to implement aspects of the present teachings.

Turning first to FIG. 1, a diagram 100 illustrating networked systems that can be used to implement aspects of the present teachings is depicted and referred to generally by reference numeral 100. For example, user 102, intermittently connected user 104, and administrator/business user 132 may be concurrently working on the same business object in their respective systems and potentially making edits to the same data object or data objects respectively. As depicted, user 102 and intermittently connected user 104 are sending updates to the backend system 154 via local computing device 108 and disconnected remote server 110 and central database (synchronization) server 112, respectively, while administrative user 106 and/or administrator/business user 132 is accessing the backend system 154 and central database (synchronization) server 112 co-located with the backend system 154. As depicted, intermittently connected user 104 may be only intermittently online (i.e., able to connect via one or more computer networks to disconnected remote server 110).

As a first example of a client/server architecture contemplated for use with embodiments of the invention, a user may interact with a web browser running on their local device, which in turn interacts with a local web server integrated with a local, embedded database system. Illustrating a system implementing such an architecture, user 102 interacts with web browser 114 on their local computing device 108. Web browser 114 in turn interacts with web server 116 running on the same computing device to store and retrieve data objects to and from local embedded database 120. In other embodiments, web server 116 reads and writes directly to local embedded database 120 via an integrated database server. Database server 118 also maintains synchronization with other instances of the object database (such as database 130 and in-memory database 138, discussed below) while local computing device 108 is online and connected to the disconnected remote server 110 or backend system 154.

As a second example of a client/server architecture contemplated for use with embodiments of the invention, a user may interact with a web browser running on their local device, which in turn interacts with a remote server integrated with its own embedded database system. Illustrating a system implementing this architecture, intermittently connected user 104 uses their local computing device 122 to interact with web browser 124. Web browser 124 in turn interacts with a web server 126 running on disconnected remote server 110, and web server 126 communicates with database 130. As depicted, database (synchronization) server 128 is the synchronization server, which acts as a controlling server for one or more other instances of embedded database systems such as database server 118 and local embedded database 120 (which, in this embodiment, act as synchronization clients). In some embodiments, a plurality of such synchronization servers may exist, which can interact with each other in a peer-to-peer or hierarchical fashion. For example, database (synchronization) server 128 may act cooperatively with central database (synchronization) server 142 (discussed below) to maintain a synchronized state for local embedded database 120, database 130, and in-memory database 138. As depicted, database (synchronization) server 128 is the synchronization server, which acts as a controlling server for one or more other instances of embedded database systems such as database server 118 and local embedded database 120 (which, in this embodiment, act as synchronization clients). In some embodiments, a single disconnected server (such as disconnected remote server 110) is present and is responsible for receiving and merging all updates from intermittently connected users such as intermittently connected user 104 using user device 122. Database (synchronization) server 128 sends and receives updates from central database (synchronization) server 142 and then distributes them as a synchronization server downstream to database server 118 and database 120. Web server 126 and web server 144 help with conflict resolution operations discussed above to resolve any conflicts between updates to the various data objects performed by users such as user 102, intermittently connected user 104, and administrator/business user 132 respectively. The identification of conflict is carried by disconnected remote server 110 (with updates from local computing device 108) and central database (synchronization) server 112 (with updates from disconnected remote server 110 and backend system 154) using internal system components.

As a third example of a client/server architecture contemplated for use with embodiments of the invention, a user may interact with a web browser running on a device co-located with the back-end server, which in turn interacts with a server and database system likewise co-located with the back-end server. Illustrating a system implementing this third architecture, administrative user 106 uses a computing device 134 that is located in the same data center as the backend system 154 to interact with web browser 146. Web browser 146 in turn interacts with a web server 144 that is also running computing device 134. In some embodiments, or for some clients, web browser 146 and web server 144 may be integrated into a single client application. As depicted, web server 144 communicates (either via central database (synchronization) server 142 or more directly via database server 136) with in-memory database 138. Central database (synchronization) server 142 may communicate with file server 140. As an example of an alternative architecture, this third architecture utilizes a separate, in-memory database 138 with separate database server 136. Such alternate placements, arrangements and substitutions are contemplated with respect to any user scenario described herein. Although three users interacting via different three systems with backend system 154 are depicted, any number of user and client devices may interact with backend system 154, and many users may interact with backend system 154 via the other web browser, web server, client device, and/or database system.

Also depicted in the data center is backend system 154 for managing the data objects, as described above. Administrator/business user 132 interacts with backend system 154 where, for example, it is necessary or desirable to manually resolve conflicting edits or updates to data objects via web server 144. In some embodiments, administrator/business user 132 may also be a user, performing transactions with respect to the data objects managed by backend system 154. As depicted, backend system 154 includes gateway 148, which receives a stream of data object updates from various database servers such as central database (synchronization) server 142 or database (synchronization) server 128. In some embodiments, database synchronization clients such as database server 118 communicate updates to database synchronization servers such as central database (synchronization) server 142, which forwards the updates to gateway 148. Gateway 148 may perform tasks related to the updates (such as, for example, serializing updates from 142 synchronization servers), and communicates the updates to Disconnected Light Operations (DLO) add-on 150. DLO add-on 150 performs data updates to backend business system and identifies any potential conflict due to a parallel update from another user. DLO add-on system 150 and Mobile Integration Framework 152 together provide functionality for managing data updates that are received from disconnected systems and applying such updates to backend system 154. DLO add-on 150 may also be responsible for data distributions of delta or data calculations for information to be shared with disconnected systems based on their subscription or allotments. Finally, DLO add-on 150 also participates in identification of conflicts, pause posting and application of resolution techniques while posting the data set in backend systems.

Figure 2:
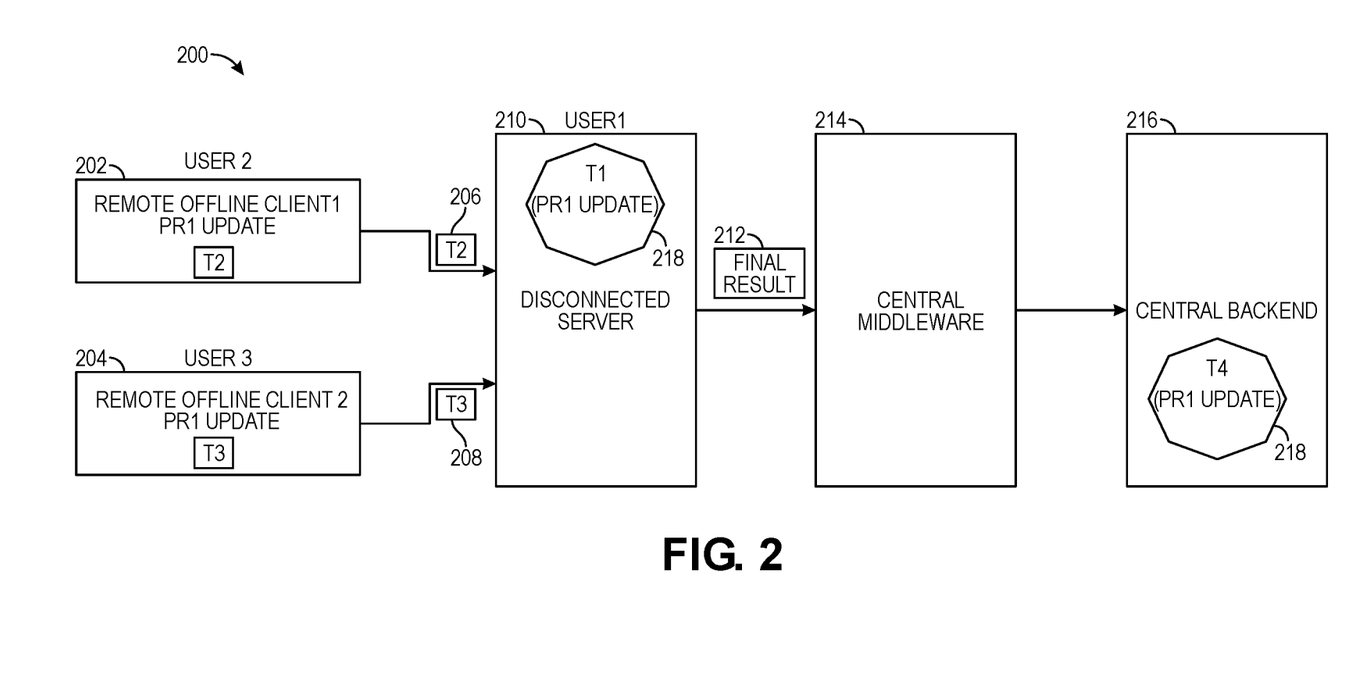
FIG. 2 is a diagram illustrating an exemplary scenario of electronic data conflict detection in periodically offline systems is depicted.

Turning now to FIG. 2, a diagram 200 illustrating an exemplary scenario of electronic data conflict detection in periodically offline systems is depicted. As depicted, first client device 202 and second client device 204 correspond to, for example, local computing device 108 of FIG. 1, while disconnected server 210 correspond to disconnected remote server 110, central middleware 214 corresponds to the central database (synchronization) server 112 in FIG. 1, and central backend 216 corresponds to backend system 154.

As depicted, user 1, user 2, and user 3 perform PR transactions T1, T2, and T3 (in that order) all interacting with the same data row. For the sake of this exemplary scenario, it may be assumed that transactions T1, T2, and T3 are performed substantially simultaneously or asynchronously due to users 2 and/or 3 being offline when one or more of the transactions are performed. Initially, user 1, operating at (or connected to) disconnected server 210 performs transaction T1. Because no conflicting transactions have been detected, transaction T1 may be transmitted on to central backend 216 (via central middleware 214). Subsequently, when client devices 202 and 204 reconnect, updates 206 and 208 are transmitted to disconnected server 210. Broadly speaking, updates 206 and 208 may be received in either order, and the conflict is detected as the conflicting transaction is received. In such a scenario, the conflict may be detected immediately at disconnected server 210, and final result 212 may be stopped from being sent to central middleware 214. Finally, transaction T4 may be performed directly on central backend 216 (by, for example, administrator/business user 132). Multiple conflicts are detected in disconnected server 210 due to T1, T2, T3. Once resolved in 210, final result 212 from disconnected server 210 (when sent to central middleware 214) also results in a conflict with transaction T4 at central backend 216.

Figure 3:
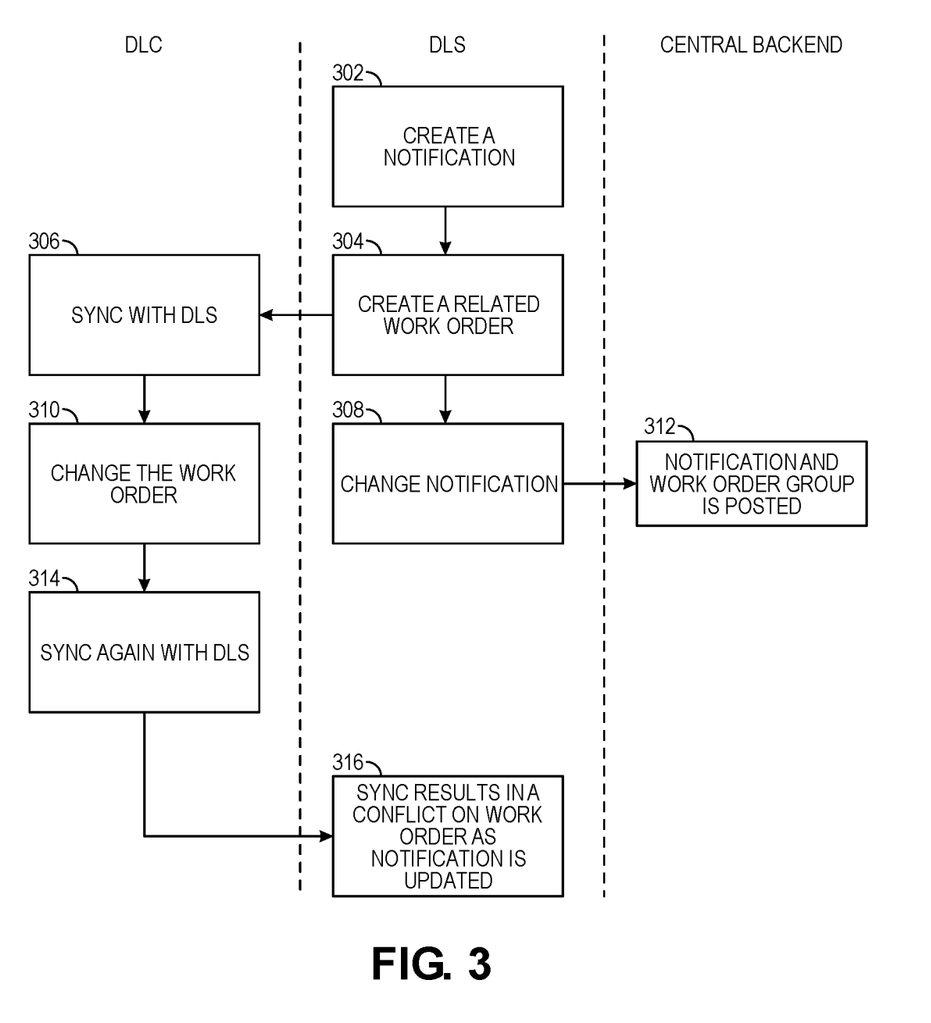
FIG. 3 is a swim lane diagram illustrating an architecture to support electronic data conflict resolution in periodically offline systems.

Turning now to FIG. 3, a swim-lane diagram is depicted, illustrating a process 300 to support methods for electronic data conflict resolution in periodically offline systems consistent with the present teachings. For example, one or more in a group of related transactions enter a data conflict thereby putting the whole group in conflict/pause state. Depicted is a scenario for a notification/work order group. In a distributed system, whenever a work order is updated, it may be the case that there exists a simultaneous update via its relation to a notification. In such a case, if the work order is blocked due to a conflict due to an update of notification, business logic may dictate how the conflicts are detected and stored in related transactions, their effect on the application use case, and that the concurrent notification update is blocked as well.

Initially, at step 302, a maintenance notification is created at the disconnected lightweight server. For example, the notification may be created (potentially automatically, without user intervention) for an asset maintenance operation. The creation of the notification in the depicted scenario results in the generation at step 304 of a work order and a purchase requisition for the parts necessary to complete the work order. When managed in disconnected mode, these three object types may be grouped to avoid inconsistent system behaviors and/or issues with functional correctness.

Thus, for example, at step 306, the disconnected lightweight client at a remote site synchronizes the newly created work order and notification. Next, concurrently or asynchronously, a first user updates the notification (for example, to update a discontinued part with its replacement) at step 308 while a second user updates the work order (for example, to defer the asset maintenance operation due to unavailability of the part) at 310. In this case, both transactions should enter a conflict state, as the work order and the notification are in the same transaction group. Responsive to the updated notification, the updated notification/work order group is posted to the central backend server at step 312. Similarly, responsive to the update of the work order at step 310, the disconnected lightweight client resynchronizes the updated work order with the disconnected lightweight server at step 314. Finally, at step 316, the resynchronization at step 314 triggers a conflict on the notification/work order group, as there are conflicting edits to the group. Once detected, these conflicting edits may be resolved according to the various resolution strategies discussed above. For example, the second user's or server state may be accepted, resulting in the first user's or client's update to the work order being rejected and the resulting update to the work order at step 310 being rolled back in order to maintain a consistent system state.

Turning now to FIG. 4, a user interface in which exemplary methods are depicted for implementing methods for electronic data conflict resolution in periodically offline systems is depicted and referred to generally by reference numeral 400. As depicted, a variety of conflict resolution views may be available via actuatable controls in user interface 400, including client synchronization view 402, server synchronization view 404, client transaction view 406 (displayed as active in user interface 400), and server transaction view 408.

Within a given conflict resolution view, all transactions (or, as appropriate, synchronization events) may be displayed or a user may search for a subset of transactions using a variety of search criteria controls. For example, depicted are change date search control 410, synchronization date search control 412, synchronization user search control 414, change user search control 416, object type search control 418, and transaction status search control 420. Once the user has selected the desired search control or controls, they may actuate search control 422 to limit the displayed transactions 424 (or, as appropriate, synchronization events) to those matching the provided search criteria.

For certain search criteria controls, the user may provide one or more enumerated field values associated with that search field. For example, transactions may have a number of possible status values, such as conflict status 426, success status 428, error status 432, retry successful status 434, retry failed status 436, transaction deleted status 438, and transaction overwritten status 440. By providing one or more of these values to transaction status search control 420, the searching user may be able to limit the displayed transactions 424 to those transactions matching the provided status or statuses. Furthermore, when viewing certain types of transactions (such as, for example, conflicted transactions or failed transactions) the user may be provided with one or more controls such as edit control 442 to resolve any conflicts or resolve any errors. In some such embodiments, edit control 442 may be dynamically updated to reflect whether the transaction is already updated (for example, to resolve a conflict status).

Figure 5A:
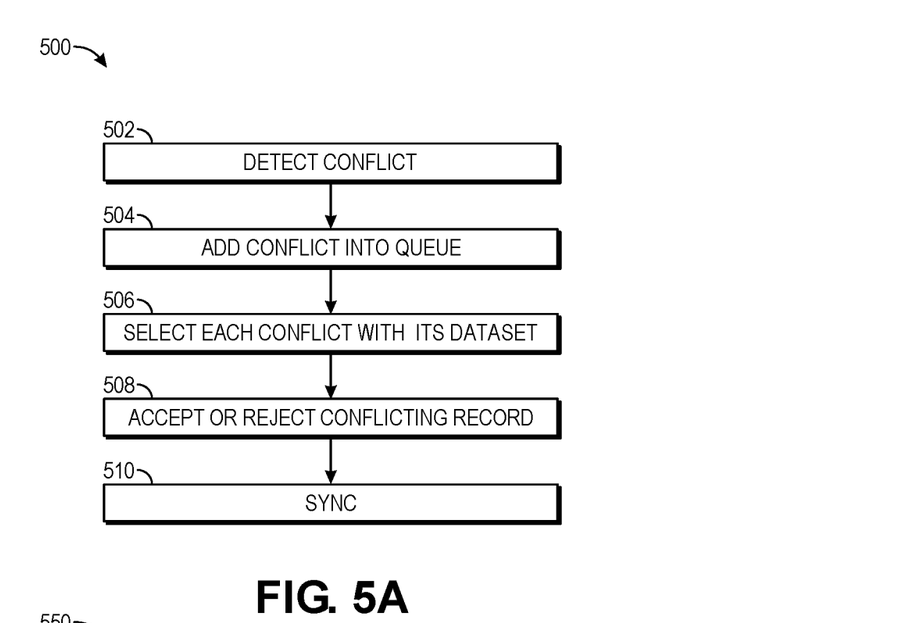
FIG. 5A is a flow diagram for methods of electronic data conflict resolution in periodically offline systems.

Turning now to FIG. 5A, a first flow diagram for methods of electronic data conflict resolution in periodically offline systems is depicted and generally referred to by reference numeral 500. Initially, at step 502, a conflict between a plurality of transactions is detected. Conflicts may be detected, for example, by the various techniques described above with respect to FIG. 3. For example, transactions, when received, may be stored in a staging table, and not moved to the main data table until the conflict check can be performed and resolved if needed. Once detected, each conflict is stored, together with the corresponding data set (for example, the conflicting transactions) into the staging table. Next, at step 504, each detected conflict is added into a resolution list. For example, the resolution list may be a first-in-first-out queue. At a subsequent point in time, at step 506, an administrator (such as, for example, administrator/business user 132) selects each conflict with the associated data set available via UI tools for review. In some embodiments, the administrator examines each conflict in order of the conflicts list. In other embodiments, the administrator can select conflicts to resolve in an arbitrary order. The administrator can manually determine which of the conflicting transitions should be accepted and which should be rejected. In some embodiments, exactly one transaction out of every set of conflicting transactions is accepted and the remaining transactions are rejected. In other embodiments, any number, including zero, of the conflicting transactions can be accepted and the remainder rejected. Processing then proceeds to step 508, where each conflicting transaction record in the conflict is accepted or rejected as indicated by the administrator. Finally, processing proceeds to step 510, where the updated state of the database (with the conflict resolved) is synchronized to all of the various database synchronization servers and database synchronization clients.

It is an advantage of the above-described conflict resolution method that it allows for transaction auditing, as each individual transaction can still be attributed to the associated user and change details. However, it is a disadvantage that the system must maintain a transaction history, data, and sequence for each conflicting record at the database row level. It is also a disadvantage that the administrator must manually resolve each conflict, with no option for bulk resolution or automatic transaction merging option. In order to address these disadvantages, an alternative conflict resolution technique is additionally provided, which can be configured dynamically, at deployment time, or for any given group of conflicting transactions.

Figure 5B:
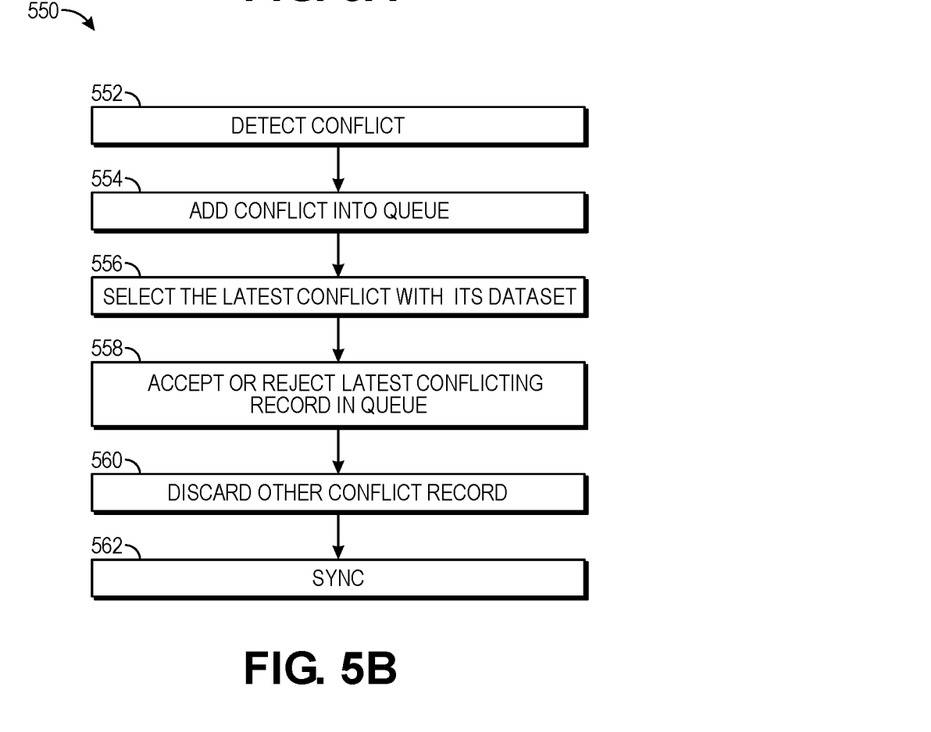
FIG. 5B is an alternative flow diagram for methods of electronic data conflict resolution in periodically offline systems.

Turning now to FIG. 5B, a second flow diagram for alternative methods of electronic data conflict resolution in periodically offline systems is depicted and generally referred to by reference numeral 550. Initially, at steps 552 and 554, conflicts are detected and stored into a resolution list. These steps may be performed as described above with respect to the corresponding steps 502 and 504 of FIG. 5A. Processing then proceeds to step 556, where the system selects the latest conflict (or, alternatively, the top conflict) in the resolution list. Next, at step 558, the system automatically accepts or rejects the conflicting transactions, updating the existing row and keeping the latest data from all transactions consolidated into one. At step 560, the remaining conflicting transaction records are discarded. Finally, at step 562, here the updated state of the database (with the conflict resolved) is synchronized to all of the various database synchronization servers and database synchronization clients as described above with respect to step 510 or FIG. 5A.

It is an advantage of this conflict resolution method that it is simple to develop, troubleshoot, and maintain. Furthermore, this approach does not have a data loss, as the latest transaction data record set in conflict list is the consolidation of all previous transaction data records/updates in the resolution list by system design. Finally, the reduction in need for administrator intervention to resolve conflicts least to a lower total cost of ownership for the data object synchronization system. The cost of these advantages, however, is that the transaction auditing possible with the first conflict resolution method is no longer possible, since the conflicting records have been merged into a single record, meaning that the transaction can no longer be attributed to a single associated user and change details. This process can also be automated by the data object synchronization system.

Figure 6:
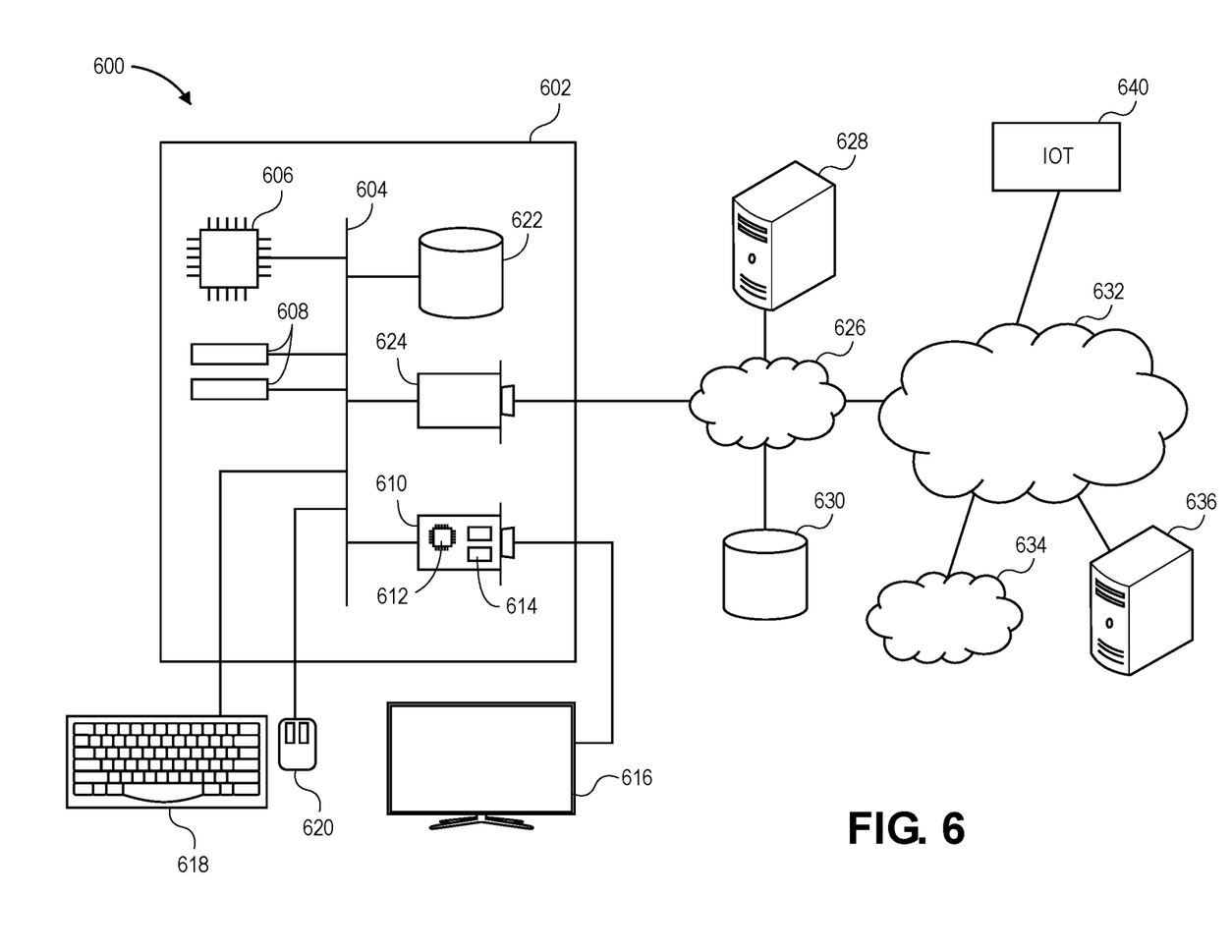
FIG. 6 is a diagram illustrating a sample computing device architecture for implementing various aspects described herein.

Turning now to FIG. 6, an exemplary hardware platform for certain embodiments is depicted and referred to generally by reference numeral 600. Computer 602 can be a desktop computer, a laptop computer, a server computer, a mobile device such as a smartphone or tablet, or any other form factor of general- or special-purpose computing device containing at least one processor. Depicted with computer 602 are several components, for illustrative purposes. In some embodiments, certain components may be arranged differently or absent. Additional components may also be present. Included in computer 602 is system bus 604, via which other components of computer 602 can communicate with each other. In certain embodiments, there may be multiple buses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also, on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, such as non-transitory computer readable media, and may be internally installed in computer 602 or externally and removably attached. Such non-transitory computer readable media may include transient memory such as RAM or other types of volatile computer readable media that do not persist stored information beyond a system shutdown or restart. It is understood that persistent storage (such as disk or solid-state drive technology) is both non-transitory as well as non-transient, in that data stored in persistent storage persists data storage beyond a system restart.

Thus, non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the Institute of Electrical and Electronics Engineers (IEEE) 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 628, accessible on a local network such as local network 626, or remotely accessible over public Internet 632. Local network 626 is in turn connected to public Internet 632, which connects many networks such as local network 626, remote network 634 or directly attached computers such as computer 636. In some embodiments, computer 602 can itself be directly connected to public Internet 632. In some embodiments, public Internet 632 connects to one or more Internet of Things devices 640.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions in a non-transitory manner, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the present teachings have been described with reference to the embodiments illustrated in the attached drawing figures, it is noted that equivalents may be employed, and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform a method for electronic data conflict resolution in periodically offline systems, the method comprising:
    in response to detecting one or more conflicts on a particular electronic data entity, inserting conflict metadata items associated with the one or more conflicts into a conflict staging data structure;
    for each of the conflict metadata items inserted into the conflict staging data structure, retrieving and evaluating the conflict metadata items with associated datasets to generate a conflict evaluation;
    based on the conflict evaluation, selecting a valid data value from among the associated datasets; and
    based on the valid data value, synchronizing the particular electronic data entity at one or more backend systems.

2. The one or more non-transitory computer-readable media of claim 1, wherein the valid data value from among the associated datasets is selected using a singleton approach.

3. The one or more non-transitory computer-readable media of claim 1, wherein the valid data value from among the associated datasets is selected using a merge approach.

4. The one or more non-transitory computer-readable media of claim 1, wherein the conflict evaluation comprises receiving input from a system administrator specifying the valid data value.

5. The one or more non-transitory computer-readable media of claim 1, wherein the method further comprises:
    detecting a dependency between the particular electronic data entity and a related electronic data entity; and
    blocking updates to the related electronic data entity until the one or more conflicts are resolved.

6. The one or more non-transitory computer-readable media of claim 1, wherein the conflict evaluation comprises ignoring the one or more conflicts and removing conflict metadata items associated with the one or more conflicts from the conflict staging data structure without updating the particular electronic data entity.

7. The one or more non-transitory computer-readable media of claim 1, wherein the method further comprises:
    preventing any subsequent update to the particular electronic data entity until the one or more conflicts is resolved.

8. A method for electronic data conflict resolution in periodically offline systems, the method comprising:
    in response to detecting one or more conflicts on a particular electronic data entity, inserting conflict metadata items associated with the one or more conflicts into a conflict staging data structure;
    for each of the conflict metadata items inserted into the conflict staging data structure, retrieving and evaluating the conflict metadata items with associated datasets to generate a conflict evaluation;
    based on the conflict evaluation, selecting a valid data value from among the associated datasets; and
    based on the valid data value, synchronizing the particular electronic data entity at one or more backend systems.

9. The method of claim 8, wherein the valid data value from among the associated datasets is selected using a singleton approach.

10. The method of claim 8, wherein the conflict staging data structure is a queue and inserting metadata associated with the one or more conflicts comprises enqueuing the metadata associated with the one or more conflicts at the queue.

11. The method of claim 8, wherein the conflict evaluation comprises receiving input from a system administrator specifying the valid data value.

12. The method of claim 8, wherein the method further comprises:
    detecting a dependency between the particular electronic data entity and a related electronic data entity; and
    blocking updates to the related electronic data entity until the one or more conflicts are resolved.

13. The method of claim 8, wherein the conflict evaluation comprises ignoring the one or more conflicts and removing conflict metadata items associated with the one or more conflicts from the conflict staging data structure without updating the particular electronic data entity.

14. The method of claim 8, wherein the valid data value from among the associated datasets is selected using a merge approach.

15. A system for electronic data conflict resolution in periodically offline systems, the system comprising:
- at least one processor; and
- and at least one non-transitory memory storing computer executable instructions that when executed by the at least one processor cause the system to carry out actions comprising:
- in response to detecting one or more conflicts on a particular electronic data entity, inserting conflict metadata items associated with the one or more conflicts into a conflict staging data structure;
- for each of the conflict metadata items inserted into the conflict staging data structure, retrieving and evaluating the conflict metadata items with associated datasets to generate a conflict evaluation;
- based on the conflict evaluation, selecting a valid data value from among the associated datasets; and
- based on the valid data value, synchronizing the particular electronic data entity at one or more backend systems.

16. The system of claim 15, wherein the valid data value from among the associated datasets is selected using a singleton approach.

17. The system of claim 15, wherein the conflict staging data structure is a queue and inserting metadata associated with the one or more conflicts comprises enqueuing the metadata associated with the one or more conflicts at the queue.

18. The system of claim 15, wherein the valid data value from among the associated datasets is selected using a merge approach.

19. The system of claim 15, wherein the conflict evaluation comprises ignoring the one or more conflicts and removing conflict metadata items associated with the one or more conflicts from the conflict staging data structure without updating the particular electronic data entity.

20. The system of claim 15, wherein the actions further comprise:
- preventing any subsequent update to the particular electronic data entity until the one or more conflicts are resolved.

* * * * *